United States Patent
Chen et al.

(10) Patent No.: US 11,244,151 B2
(45) Date of Patent: Feb. 8, 2022

(54) COMPUTER-IMPLEMENTED METHOD OF RECOGNIZING FACIAL EXPRESSION, APPARATUS FOR RECOGNIZING FACIAL EXPRESSION, METHOD OF PRE-TRAINING APPARATUS FOR RECOGNIZING FACIAL EXPRESSION, COMPUTER-PROGRAM PRODUCT FOR RECOGNIZING FACIAL EXPRESSION

(71) Applicant: BOE Technology Group Co., Ltd., Beijing (CN)

(72) Inventors: Guannan Chen, Beijing (CN); Honghong Jia, Beijing (CN); Lijie Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 134 days.

(21) Appl. No.: 16/639,934

(22) PCT Filed: Oct. 10, 2019

(86) PCT No.: PCT/CN2019/110275
§ 371 (c)(1),
(2) Date: Feb. 18, 2020

(87) PCT Pub. No.: WO2020/143255
PCT Pub. Date: Jul. 16, 2020

(65) Prior Publication Data
US 2021/0133434 A1 May 6, 2021

(30) Foreign Application Priority Data
Jan. 10, 2019 (CN) .......................... 201910023676.5

(51) Int. Cl.
*G06K 9/46* (2006.01)
*G06K 9/62* (2006.01)
(Continued)

(52) U.S. Cl.
CPC ..... *G06K 9/00315* (2013.01); *G06K 9/00281* (2013.01); *G06K 9/4609* (2013.01);
(Continued)

(58) Field of Classification Search
CPC combination set(s) only.
See application file for complete search history.

(56) References Cited

U.S. PATENT DOCUMENTS

2016/0171346 A1* 6/2016 Han ................... G06K 9/00624
382/103
2016/0284348 A1 9/2016 Yu et al.
(Continued)

FOREIGN PATENT DOCUMENTS

CN 106257489 A 12/2016
CN 106407915 A 2/2017
(Continued)

OTHER PUBLICATIONS

Tanapol, "Facial expression recognition using local Gabor filters and PCA plus LDA", Jan. 11, 2018, 2017 9th International Conference on Information Technology and Electrical Engineering (ICITEE), Phuket, Thailand, pp. 1-5.*
(Continued)

*Primary Examiner* — Omar S Ismail
(74) *Attorney, Agent, or Firm* — Intellectual Valley Law, P.C.

(57) ABSTRACT

A computer-implemented method of recognizing a facial expression of a subject in an input image is provided. The method includes filtering the input image to generate a plurality of filter response images; inputting the input image into a first neural network; processing the input image using the first neural network to generate a first prediction value; inputting the plurality of filter response images into a second neural network; processing the plurality of filter response
(Continued)

images using the second neural network to generate a second prediction value; weighted averaging the first prediction value and the second prediction value to generate a weighted average prediction value; and generating an image classification result based on the weighted average prediction value.

20 Claims, 10 Drawing Sheets

(51) Int. Cl.
  *G06N 3/04* (2006.01)
  *G06K 9/00* (2006.01)
  *G06N 3/08* (2006.01)
(52) U.S. Cl.
  CPC ......... *G06K 9/6256* (2013.01); *G06N 3/0454* (2013.01); *G06N 3/08* (2013.01)

(56) References Cited

U.S. PATENT DOCUMENTS

| | | | | |
|---|---|---|---|---|
| 2017/0286809 | A1* | 10/2017 | Pankanti | G06N 3/084 |
| 2017/0308734 | A1* | 10/2017 | Chalom | G06K 9/6267 |
| 2018/0357501 | A1 | 12/2018 | Ma | |
| 2019/0130229 | A1* | 5/2019 | Lu | G06K 9/4628 |
| 2019/0340763 | A1* | 11/2019 | Laserson | A61B 6/5235 |

FOREIGN PATENT DOCUMENTS

| | | |
|---|---|---|
| CN | 107123117 A | 9/2017 |
| CN | 107358157 A | 11/2017 |
| CN | 107491726 A | 12/2017 |
| CN | 107609598 A | 1/2018 |
| CN | 107844780 A | 3/2018 |
| CN | 107918780 A | 4/2018 |
| CN | 108647625 A | 10/2018 |

OTHER PUBLICATIONS

R. Ramanathan, "A Support Vector Machines Approach for Efficient Facial Expression Recognition", Nov. 17, 2009, 2009 International Conference on Advances in Recent Technologies in Communication and Computing, pp. 850-852.*
Yiting Tao, "DenseNet-Based Depth-Width Double Reinforced Deep Learning Neural Network for High-Resolution Remote Sensing Image Per-Pixel Classification", May 18, 2018, Remote Sens. 2018, 10, 779; doi:10.3390/rs10050779, pp. 1-9.*
M. Arfan Jaffar, "Facial Expression Recognition using Hybrid Texture Features based Ensemble Classifier", vol. 8, No. 6, 2017, (IJACSA) International Journal of Advanced Computer Science and Applications, pp. 449-451.*
International Search Report & Written Opinion dated Jan. 7, 2020, regarding PCT/CN2019/110275.
First Office Action in the Chinese Patent Application No. 201910023676.5 dated May 28, 2020; English translation attached.
Octavio Arriaga, et al., "Real-time Convolutional Neural Networks for Emotion and Gender Classification", arXiv:1710.07557v1[cs.CV] Oct. 20, 2017.
Wei-Yi Chang, et al., "FATAUVA—Net: An Integrated Deep Learning Framework for Facial Attribute Recognition, Action Unit Detection, and Valence-Arousal Estimation", CVPR 2017 Workshop.
Jingang Zhang et al., "Multiple Concolutional Neural Networks for Facial Expression Sequence Recognition", Journal of Xidian University, vol. 45, No. 1, Feb. 2018, English Translation of the Abstract Attached.
Second Office Action in the Chinese Patent Application No. 201910023676.5 dated Nov. 13, 2020; English translation attached.

* cited by examiner

```
Providing a first neural network and a second neural network
```

```
Inputting a training image into an apparatus including the first
neural network and the second neural network, and tuning
parameters of the first neural network and the second neural
network
```

```
Reiterating pre-training the first neural network and the second
neural network.
```

COMPUTER-IMPLEMENTED METHOD OF RECOGNIZING FACIAL EXPRESSION, APPARATUS FOR RECOGNIZING FACIAL EXPRESSION, METHOD OF PRE-TRAINING APPARATUS FOR RECOGNIZING FACIAL EXPRESSION, COMPUTER-PROGRAM PRODUCT FOR RECOGNIZING FACIAL EXPRESSION

CROSS-REFERENCE TO RELATED APPLICATION

This application is a national stage application under 35 U.S.C. § 371 of International Application No. PCT/CN2019/110275, filed Oct. 10, 2019, which claims priority to Chinese Patent Application No. 201910023676.5, filed Jan. 10, 2019. Each of the forgoing applications is herein incorporated by reference in its entirety for all purposes.

TECHNICAL FIELD

The present invention relates to display technology, more particularly, to a computer-implemented method of recognizing a facial expression of a subject in an input image, an apparatus for recognizing a facial expression of a subject in an input image, a method of pre-training an apparatus for recognizing a facial expression of a subject in an input image, and a computer-program product for recognizing a facial expression of a subject in an input image.

BACKGROUND

In present, facial recognition is widely used in various aspects including security, finance entertainment, etc. Facial recognition includes emotion recognition which includes identifying facial expression.

SUMMARY

In one aspect, the present invention provides a computer-implemented method of recognizing a facial expression of a subject in an input image, comprising filtering the input image to generate a plurality of filter response images; inputting the input image into a first neural network; processing the input image using the first neural network to generate a first prediction value; inputting the plurality of filter response images into a second neural network; processing the plurality of filter response images using the second neural network to generate a second prediction value; weighted averaging the first prediction value and the second prediction value to generate a weighted average prediction value; and generating an image classification result based on the weighted average prediction value.

Optionally, filtering the input image is performed using a plurality of Gabor filters.

Optionally, filtering the input image is performed using a plurality of filters to generate a plurality of initial filter response images of different scales and/or different orientations.

Optionally, the plurality of initial filter response images of different scales and different orientations comprise initial filter response images of five different scales and/or eight different orientations.

Optionally, the computer-implemented method further comprises selecting a fraction of the plurality of initial filter response images as the plurality of filter response images; wherein the fraction of the plurality of initial filter response images are filter response images having scales and orientations empirically determined to be correlated to an accuracy of the second prediction result with correlation coefficients higher than a threshold value.

Optionally, a respective one of the plurality of filter response images has a scale selected from a group consisting of a 48×48 scale and a 67×67 scale, and an orientation selected from a group consisting of 0, $\pi$, and $2\pi/8$.

Optionally, the first neural network is a DenseNet; and the second neural network is a DenseNet.

Optionally, weighted averaging the first prediction value and the second prediction value is performed according to $P=P1*\alpha+P2*(1-\alpha)$; wherein P stands for the weighted average prediction value, P1 stands for the first prediction value; P2 stands for the second prediction value; $\alpha$ stands for a first weight of the first prediction value, and $(1-\alpha)$ stands for a second weight of the second prediction value.

In another aspect, the present invention provides an apparatus for recognizing a facial expression of a subject in an input image, comprising a memory; and one or more processors; wherein the memory and the one or more processors are connected with each other; and the memory stores computer-executable instructions for controlling the one or more processors to filter the input image to generate a plurality of filter response images; input the input image into a first neural network; process the input image using the first neural network to generate a first prediction value; input the plurality of filter response images into a second neural network; process the plurality of filter response images using the second neural network to generate a second prediction value; weighted average the first prediction value and the second prediction value to generate a weighted average prediction value; and generating an image classification result based on the weighted average prediction value.

Optionally, the memory stores computer-executable instructions for controlling the one or more processors to filter the input image using a plurality of Gabor filters.

Optionally, the memory stores computer-executable instructions for controlling the one or more processors to filter the input image using a plurality of filters to generate a plurality of initial filter response images of different scales and/or different orientations.

Optionally, the plurality of initial filter response images of different scales and different orientations comprise initial filter response images of five different scales and/or eight different orientations.

Optionally, the memory stores computer-executable instructions for controlling the one or more processors to select a fraction of the plurality of initial filter response images as the plurality of filter response images; wherein the fraction of the plurality of initial filter response images are filter response images having scales and orientations empirically determined to be correlated to an accuracy of the second prediction result with correlation coefficients higher than a threshold value.

Optionally, a respective one of the plurality of filter response images has a scale selected from a group consisting of a 48×48 scale and a 67×67 scale, and an orientation selected from a group consisting of 0, $\pi/8$, and $2\pi/8$.

Optionally, the first neural network is a DenseNet; and the second neural network is a DenseNet.

Optionally, the memory stores computer-executable instructions for controlling the one or more processors to weighted average the first prediction value and the second prediction value according to $P=P1*\alpha+P2*(1-\alpha)$; wherein P stands for the weighted average prediction value, P1 stands for the first prediction value; P2 stands for the second prediction value; a stands for a first weight of the first prediction value, and (1−α) stands for a second weight of the second prediction value.

In another aspect, the present invention provides a method of pre-training an apparatus for recognizing a facial expression of a subject in an input image, comprising selecting a training image having a pre-determined classification; filtering the training image to generate a plurality of training filter response images; inputting the training image into a first neural network; processing the training image using the first neural network to generate a training first prediction value; inputting the plurality of training filter response images into a second neural network; processing the plurality of training filter response images using the second neural network to generate a training second prediction value; weighted averaging the training first prediction value and the training second prediction value to generate a weighted average prediction value; generating a training image classification result based on the weighted average prediction value; computing a loss between the pre-determined classification and the training image classification result using a loss function; and tuning parameters of the first neural network and the second neural network based on the loss.

Optionally, the method further comprises reiterating pre-training the first neural network and the second neural network.

Optionally, filtering the training image is performed using a plurality of Gabor filters.

Optionally, filtering the training image is performed using a plurality of filters to generate a plurality of training initial filter response images of different scales and/or different orientations.

Optionally, the plurality of training initial filter response images of different scales and different orientations comprise training initial filter response images of five different scales and/or eight different orientations.

Optionally, the method further comprises selecting a fraction of the plurality of training initial filter response images as the plurality of training filter response images; wherein the fraction of the plurality of training initial filter response images are training filter response images having scales and orientations empirically determined to be correlated to an accuracy of the training second prediction result with correlation coefficients higher than a threshold value.

Optionally, a respective one of the plurality of training filter response images has a scale selected from a group consisting of a 48×48 scale and a 67×67 scale, and an orientation selected from a group consisting of 0, π/8, and 2π/8.

Optionally, the first neural network is a DenseNet; and the second neural network is a DenseNet.

Optionally, weighted averaging the training first prediction value and the training second prediction value is performed according to P'=P1'*α'+P2'*(1−α'); wherein P' stands for the training weighted average prediction value, P1' stands for the training first prediction value; P2' stands for the training second prediction value; α' stands for a first weight of the training first prediction value, and (1−α') stands for a second weight of the training second prediction value.

In another aspect, the present invention provides a computer-program product, for recognizing a facial expression of a subject in an input image, comprising a non-transitory tangible computer-readable medium having computer-readable instructions thereon, the computer-readable instructions being executable by a processor to cause the processor to perform filtering the input image to generate a plurality of filter response images; inputting the input image into a first neural network; processing the input image using the first neural network to generate a first prediction value; inputting the plurality of filter response images into a second neural network; processing the plurality of filter response images using the second neural network to generate a second prediction value; weighted averaging the first prediction value and the second prediction value to generate a weighted average prediction value; and generating an image classification result based on the weighted average prediction value.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Because the complexity of a facial expression, the process of classifying different facial expressions using machine learning technology barely reaches a high accuracy rate. However, the development of deep leaning technology provides a method to increase the accuracy rate of classifying different expressions.

Accordingly, the present disclosure provides, inter alia, a computer-implemented method of recognizing a facial expression of a subject in an input image, an apparatus for recognizing a facial expression of a subject in an input image, a method of pre-training an apparatus for recognizing a facial expression of a subject in an input image, and a computer-program product for recognizing a facial expression of a subject in an input image that substantially obviate one or more of the problems due to limitations and disadvantages of the related art. In one aspect, the present disclosure provides a computer-implemented method of recognizing a facial expression of a subject in an input image. In some embodiments, the computer-implemented method includes filtering the input image to generate a plurality of filter response images; inputting the input image into a first neural network; processing the input image using the first neural network to generate a first prediction value; inputting the plurality of filter response images into a second neural network; processing the plurality of filter response images using the second neural network to generate a second prediction value; and weighted averaging the first prediction value and the second prediction value to generate a weighted average prediction value; and generating an image classification result based on the weighted average prediction value.

Figure 1:
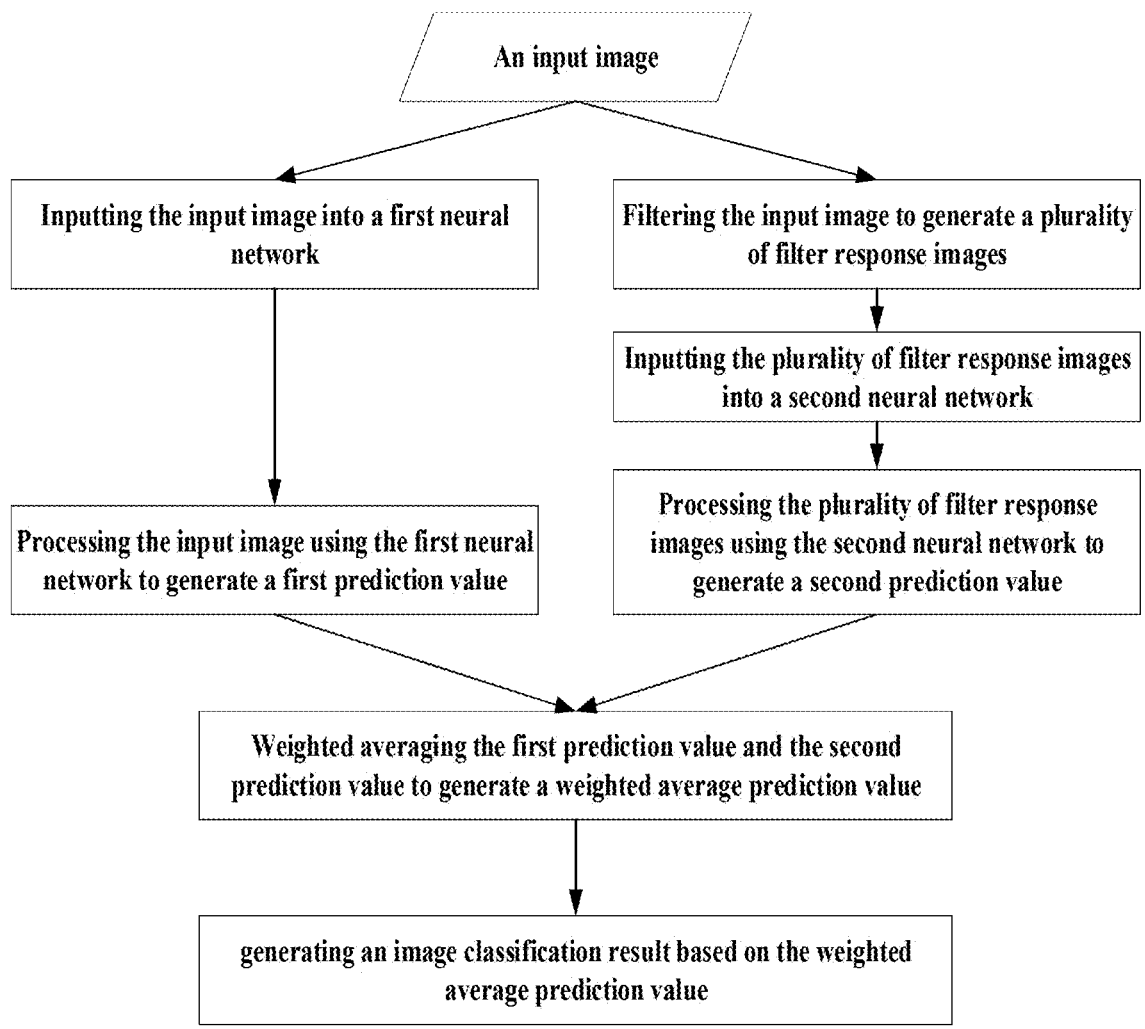
FIG. 1 is a flow chart illustrating a computer-implemented method of recognizing a facial expression of a subject in some embodiments according to the present disclosure.

FIG. 1 is a flow chart illustrating a computer-implemented method of recognizing a facial expression of a subject in some embodiments according to the present disclosure. In some embodiments, the method includes inputting the input image into a first neural network; and processing the input image using the first neural network to generate a first prediction value.

In some embodiments, the method includes filtering the input image to generate a plurality of filter response images; inputting the plurality of filter response images into a second neural network; and processing the plurality of filter response images using the second neural network to generate a second prediction value. Optionally, filtering the input image includes extracting features from the input image, so the plurality of filter response images includes the features extracted from the input image.

In some embodiments, the method includes weighted averaging the first prediction value and the second prediction value to generate a weighted average prediction value; and generating an image classification result based on the weighted average prediction value.

The first neural network is configured to analyze the input image to generate the first prediction value and the second neural network is configured to analyze the plurality of filter response images to generate the second prediction value. By using two neural networks (e.g., the first neural network and the second neural network) to respectively analyze the input image and the plurality of filter response images, and combine (e.g., weighted averaging) the first prediction value and the second prediction value, the speed of the process of recognizing the facial expression is increased, and the accuracy of recognizing the facial expression is improved.

Figure 2:
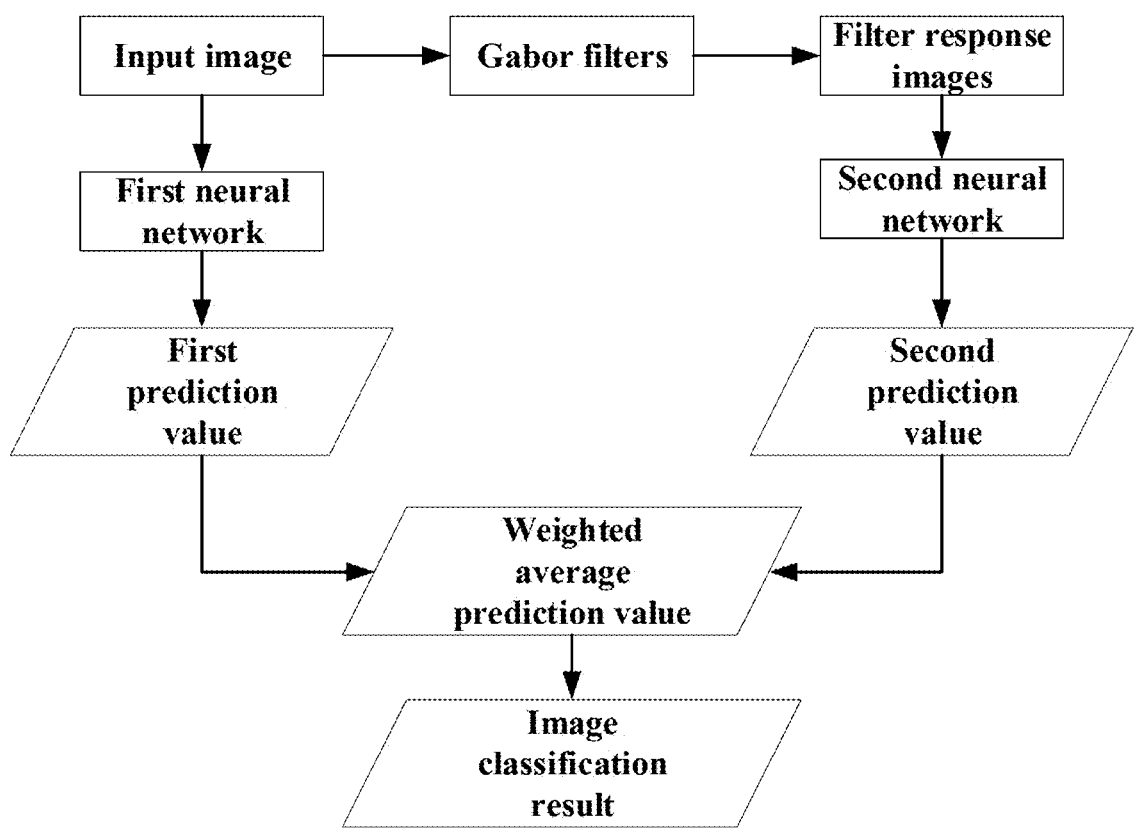
FIG. 2 is a schematic diagram of a structure of an apparatus for recognizing a facial expression in some embodiments according to the present disclosure.

FIG. 2 is a schematic diagram of a structure of an apparatus for recognizing a facial expression in some embodiments according to the present disclosure. Various appropriate filters may be used to filter the input image. Examples of filters suitable for filtering the input image include, but are not limited to, Gabor filter, Steerable filters, Schmid filters. In some embodiments, referring to FIG. 2, filtering the input image is performed using a plurality of Gabor filters. Optionally, a respective one of the plurality of Gabor filters has a scale selected from a group consisting of different scales and an orientation selected from a group consisting of different orientations.

In some embodiments, the first neural network is a convolutional neural network. The second neural network is a convolutional neural network. Various appropriate sub-networks are included in the first neural network and the second neural network. Examples of sub-networks suitable in the first neural network and the second neural network include DenseNet, ResNet, Wide ResNet, Dual-Path-Net, and Senet. For example, the first neural network is a DenseNet (e.g., a first DenseNet), and the second neural network is a DenseNet (e.g., a second DenseNet).

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image (e.g., a feature map, a data, a signal). An up-sampling layer and a down-sampling layer can change a scale of an input image to one corresponding to a certain convolutional layer. The output from the up-sampling layer or the down-sampling layer can then be processed by a convolutional layer of a corresponding scale. This enables the convolutional layer to add or extract a feature having a scale different from that of the input image.

By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

In some embodiments, the input image is input in both the first neural network and the plurality of Gabor filters. Subsequent to filtering the input image using the plurality of Gabor filters, the plurality of filter response images are output. Optionally, the plurality of filter response images are input into the second neural network. Optionally, the first prediction value is output from the first neural network, and the second prediction value is output from the second neural network. Optionally, the first prediction value and the second prediction value are weighted averaged to generate the weighted average prediction value. Optionally, the image classification result is generated based on the weighted average prediction value.

The Gabor filter is a linear filter used for texture analysis, for example, the Gabor filter is configured to analyze whether there are any specific frequency content in the image in specific direction in a region of analysis. The two-dimensional Gabor function can better describe characteristics or shapes of the receptive field of in a mammalian visual system. As the developments of wavelet transform and neurophysiology, the Gabor transform gradually evolves into a form of a two-dimensional Gabor wavelet. The Gabor filter has a strong robustness to the brightness of an image, the contrast of the image, and the facial expression changes in the image. To process a facial image, the Gabor filter can be used to express most useful local features for facial recognition.

A Gabor filter is a product of a Gaussian envelope function times a sinusoid function, and the Gabor filter can be represented using a following Gabor function (1):

$$g(x, y; \lambda, \theta, \phi, \sigma, \gamma) = e^{-\frac{1}{2}\left[\left(\frac{x'}{\sigma}\right)^2 + \left(\frac{y'}{\sigma}\right)^2\right]} e^{i\left(\left(\frac{2\pi i x'}{\lambda} + \phi\right)\right)}; \quad (1)$$

wherein $\lambda$ stands for a wavelength of a sinusoidal factor, a value of $\lambda$ is specified in pixels, in general, the value of the $\lambda$ is real number and greater than or equal to 2, optionally, the value of the $\lambda$ is smaller than one-fifth of a size (e.g., length or width) of the input image; $\theta$ stands for an orientation of a normal to parallel stripes of the Gabor function, $\theta$ is in a range of 0 to $2\pi$; $\phi$ stands for a phase offset of a sinusoidal function, $\phi$ is in a range of $-\pi$ to $\pi$, for example, the values 0 and $2\pi$ correspond to center-symmetric 'center-on' and 'center-off' functions, respectively, while $-\pi$ and $\pi$ it correspond to anti-symmetric functions; $\sigma$ stands for a sigma/standard deviation of the Gaussian envelope function; $\gamma$ stands for a spatial aspect ratio and specifies the ellipticity of the support of the Gabor function. For $\gamma=1$, the support is circular. For $\gamma<1$ the support is elongated in orientation of the parallel stripes of the function. A default value is $\gamma=0.5$.

A half-response spatial frequency bandwidth b of the Gabor filter is related to the ratio $\delta/\lambda$, a relation between b, $\delta$, and $\lambda$ are shown in a following equation (2):

$$b = \log_2 \frac{\frac{\sigma}{\lambda}\pi + \sqrt{\frac{\ln 2}{2}}}{\frac{\sigma}{\lambda}\pi - \sqrt{\frac{\ln 2}{2}}} \quad \frac{\sigma}{\lambda} = \frac{1}{\pi}\sqrt{\frac{\ln 2}{2}} \cdot \frac{2^b+1}{2^b-1}; \quad (2)$$

Wherein $\sigma$ and $\lambda$ are the standard deviation of the Gaussian factor of the Gabor function and the preferred wavelength, respectively; the value of $\sigma$ cannot be specified directly and is based on the value of b, b is a positive real number, for example, b=1, so $\delta=0.56\lambda$.

Figure 3:
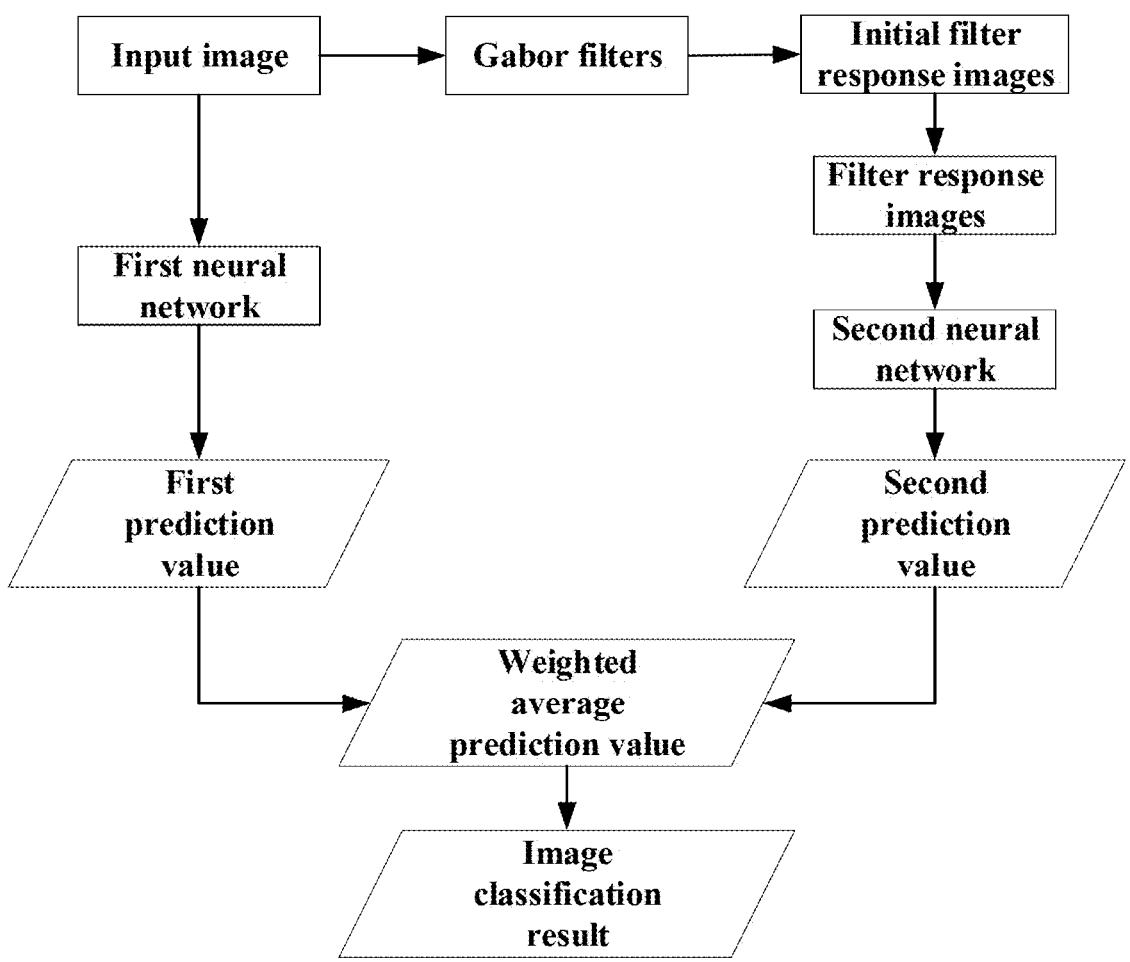
FIG. 3 is a schematic diagram of a structure of an apparatus for recognizing a facial expression in some embodiments according to the present disclosure.

FIG. 3 is a schematic diagram of a structure of an apparatus for recognizing a facial expression in some embodiments according to the present disclosure. Referring to FIG. 3, in some embodiments, filtering the input image is performed using the plurality of filters to generate a plurality of initial filter response images of different scales and/or different orientations. Optionally, the plurality of initial filter response images of different scales and/or different orientations refers to initial filter response images respectively generated using a plurality of filters having different scales and/or different orientations. Optionally, the different scales of the plurality of initial filter response images refers to different scales of the plurality of filters used to respectively generate the plurality of initial filter response images. Optionally, the different orientations of the plurality of initial filter response images refers to different orientations of the plurality of filters used to respectively generate the plurality of initial filter response images.

Optionally, the plurality of initial filter response images of different scales and/or different orientations are respectively generated using the plurality of filters having different scales and/or different orientations.

Optionally, the plurality of Gabor filters of different scale and/or different orientations are applied on the input image to respectively generate the plurality of initial filter response images of different scale and/or different orientations, and the orientation is an orientation of the normal to parallel stripes of the Gabor function. A scale of filter refers to one or any combinations of three dimensions of a filter, including one or any combinations of a width of the filter, a height of the filter, and a depth of the filter. In one example, the scale of a filter refers to a "volume" of a filter, which includes the width of the filer, the height of the filter, and the depth of the filter. In another example, spatial scale of a filter refers to a width and length of the filter, e.g., width×length. For example, the depth of the filter corresponds to a depth of an image to be filtered.

For example, a respective one of the plurality of initial filter response images has two parameters, e.g., a parameter of scale and a parameter of orientation. The parameter of scale is selected from a group consisting of different scales. The parameter of orientation is selected from a group consisting of different orientations. Optionally, a fraction of the plurality of initial filter response images respectively have different scales but have a same orientation. Optionally, a fraction of the plurality of initial filter response images respectively have different orientations but have a same scale.

Optionally, the plurality of initial filter response images of different scales and different orientations include initial filter response images of five different scales and/or eight different orientations. For example, forty Gabor filters are applied on an input image to perform a Gabor filtering to respectively generate forty initial filter response images, and a respective one of the forty initial filter response images includes a scale selected from five different scales, and an orientation selected from eight different orientations.

Optionally, referring to FIG. 3, the method further includes selecting a fraction of the plurality of initial filter response images as the plurality of filter response images. Optionally, the fraction of the plurality of initial filter response images are filter response images having scales and orientations empirically determined to be correlated to an accuracy of the second prediction result with correlation coefficients higher than a threshold value. For example, the initial filter response images of two different scales and/or three different orientations are selected as the plurality of filter response images.

Optionally, a respective one of the plurality of filter response images has a scale selected from a group consisting of a 48×48 scale and a 67×67 scale, and an orientation selected from a group consisting of 0, $\pi/8$, and $2\pi/8$.

Figure 4:
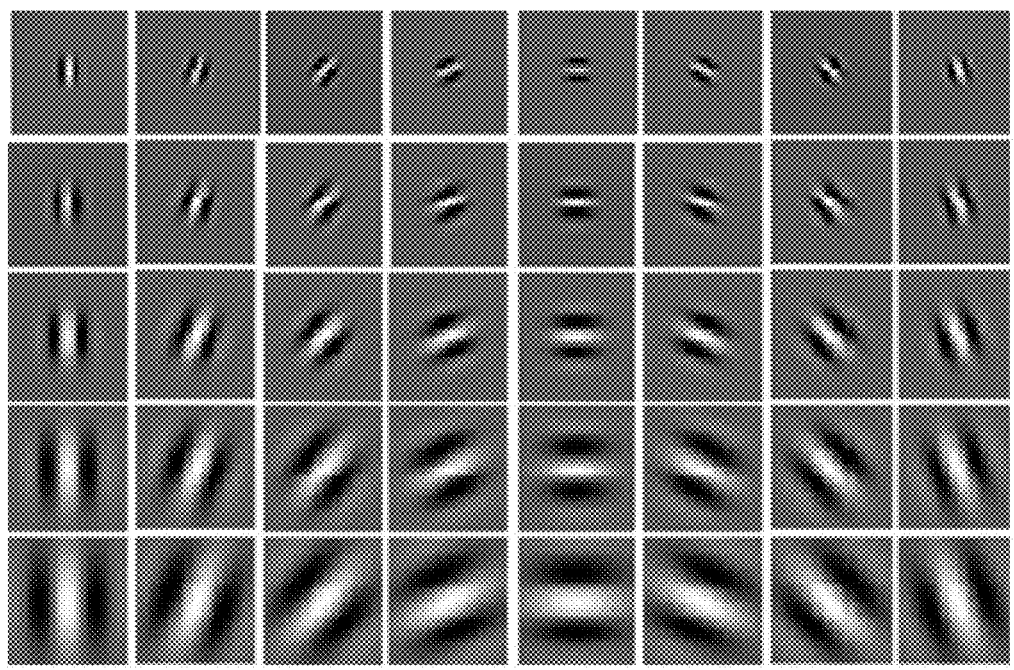
FIG. 4 is a schematic diagram of a plurality of filter response images obtained subsequent to applying a plurality of Gabor filters on an input image in some embodiments according to the present disclosure.

FIG. 4 is a schematic diagram of a plurality of filter response images obtained subsequent to applying a plurality of Gabor filters on an input image in some embodiments according to the present disclosure. FIG. 4 shows a plurality of filter response images. A plurality of rows of filter response images respectively represent a plurality of scales, for example, the plurality of filter response images in FIG. 4 has five different scales. A plurality of columns of filter response images respectively represent a plurality of orientations, for example, the plurality of filter response images in FIG. 4 has eight different orientations.

Figure 5:
FIG. 5 is a schematic diagram of an input image in some embodiments according to the present disclosure.
Figure 6:
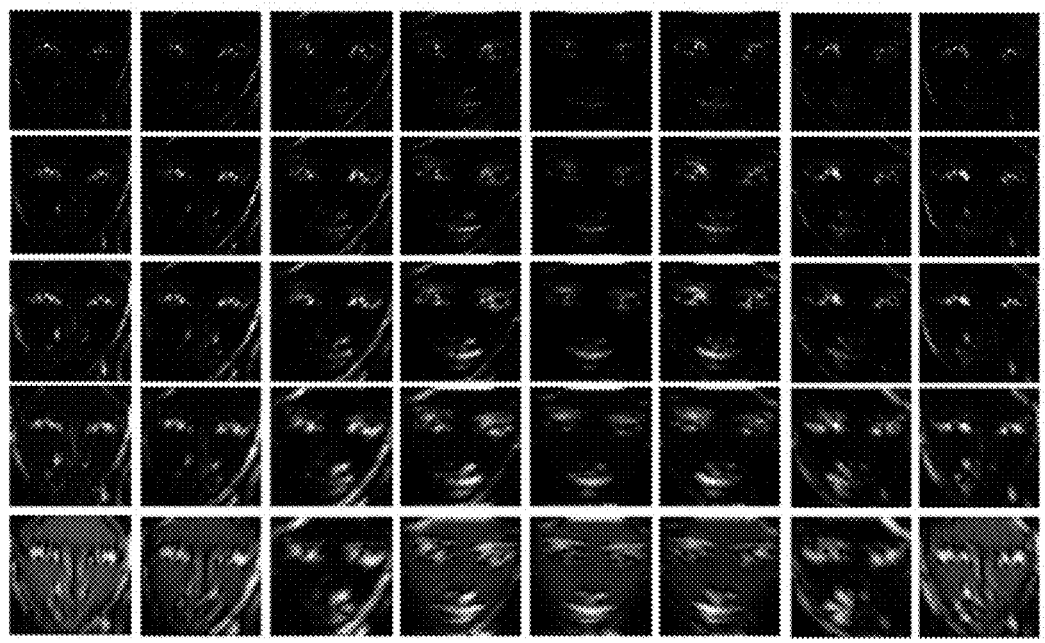
FIG. 6 is a schematic diagram of a plurality of initial filter response images obtained subsequent to applying a plurality of Gabor filters on the input image in FIG. 5.

FIG. 5 is a schematic diagram of an input image in some embodiments according to the present disclosure. FIG. 6 is a schematic diagram of a plurality of initial filter response images obtained subsequent to applying a plurality of Gabor filters on the input image in FIG. 5. FIG. 5 is a face image (e.g., an input image), and FIG. 6 shows a plurality of initial filter response images obtained subsequent to applying the plurality of Gabor filters on the face image in FIG. 5.

In some embodiments, in order to reduce an amount of data processed by the apparatus for recognizing the facial expression (especially by the second neural network), and to involve less computation, a fraction of the plurality of initial filter response images, empirically determined to be correlated to an high accuracy of the second prediction result, are selected.

Optionally, a Support Vector Machine (SVM) algorithm are used in the process of selecting the fraction of the plurality of initial filter response images. For example, facial express data (e.g., from JAFFE database) is analyzed using SVM, so correlation coefficients, related to the accuracy of the second prediction, respectively corresponding to the plurality of initial filter response images having different scales and/or different orientations are obtained. based on different correlation coefficients, a fraction of plurality of initial filter response images having correlation coefficients higher than a threshold value is selected as the plurality of filter response images input in the second neural network. For example, the threshold value is in a range of 85% to 100%, e.g., 85% to 90%, 90% to 95%, and 95% to 100%.

Since the plurality of filter response images of different scales and/or different orientations are respectively generated by using the plurality of filters having different scales and/or different orientations, the plurality of filters having different scales and/or different orientations are also correlated to the accuracy of the second prediction result with correlating coefficients.

Table 1 shows different correlation coefficients of the accuracy of the second prediction result corresponding to filters having different scales, respectively.

TABLE 1

| Scales of filters | 24 × 24 | 33 × 33 | 48 × 48 | 67 × 67 | 96 × 96 |
|---|---|---|---|---|---|
| Correlation coefficients | 86% | 87% | 91% | 95% | 87% |

Table 2 shows different correlation coefficients of the accuracy of the second prediction result corresponding to filters having different orientations, respectively.

TABLE 2

| | Orientations of filters | | | | | | | |
|---|---|---|---|---|---|---|---|---|
| | 0 | $\pi/8$ | $2\pi/8$ | $3\pi/8$ | $4\pi/8$ | $5\pi/8$ | $6\pi/8$ | $7\pi/8$ |
| Correlation coefficients | 92% | 92% | 89% | 87% | 78% | 76% | 87% | 86% |

Referring to Table 1, correlation coefficients of the accuracy of the second prediction result obtained using filters having the 48×48 scale, and the 67×67 scale are higher than correlation coefficients of the accuracy of the second prediction result obtained using filters having a 24×24 scale, a 33×33 scale, and a 96×96 scale, so that filters having the 48×48 scale, and the 67×67 scale have a relatively larger contribution on the accuracy of the second prediction result than the filters having the 24×24 scale, the 33×33 scale, and the 96×96 scale; and the initial filter response images having the 24×24 scale, the 33×33 scale, and the 96×96 scale having a relatively larger contribution on the accuracy of the second prediction result than the filters having the 24×24 scale, the 33×33 scale, and the 96×96 scale.

Referring to Table 2, correlation coefficients of the accuracy of the second prediction result obtained using filters having the 0 orientation, the $\pi/8$ orientation, and the $2\pi/8$ orientation are higher than correlation coefficients of the accuracy of the second prediction result obtained using filters having a $3\pi/8$ orientation, a $4\pi/8$ orientation, a $5\pi/8$ orientation, a $6\pi/8$ orientation, and a $7\pi/8$ orientation, so that filters having the 0 orientation, the $\pi/8$ orientation, and the $2\pi/8$ orientation have a relatively larger contribution on the accuracy of the second prediction result than the filters having $3\pi/8$ orientation, the $4\pi/8$ orientation, the $5\pi/8$ orientation, the $6\pi/8$ orientation, and the $7\pi/8$ orientation; and the initial filter response images having the 0 orientation, the $\pi/8$ orientation, and the $2\pi/8$ orientation having a relatively larger contribution on the accuracy of the second prediction result than the filters having $3\pi/8$ orientation, the $4\pi/8$ orientation, the $5\pi/8$ orientation, the $6\pi/8$ orientation, and the $7\pi/8$ orientation.

So, in some embodiments, the fraction of the plurality of initial filter response images selected as the plurality of filter response images includes initial filter responses images, a respective one of which has the scale selected from the group consisting of the 48×48 scale and the 67×67 scale, and the orientation selected from the group consisting of the 0 orientation, the $\pi/8$ orientation, and the $2\pi/8$ orientation, and those selected initial filter response images are input into the second neural network.

In some embodiments, both the first neural network and the second neural network are DenseNet. Optionally, a DenseNet includes a plurality of Dense Blocks. Optionally, a respective one of the plurality of Dense Blocks includes a plurality of convolutional layers including a convolutional layer having a kernel of a 1×1 size, and a convolutional layer having a kernel of a 3×3 size. For example, the convolutional layer having a kernel of the 1×1 size is configured to reduce a scale of an image (e.g., a feature map, a data, a signal). The convolutional layer of the kernel of the 3×3 size are configured to extract features of an image (e.g., a feature map, a data, a signal).

As used herein, the term "scale of an image" refers to one or any combinations of three dimensions of an image, including one or any combinations of a width of the image, a height of the image, and a depth of the image. In one example, the scale of an image (e.g., a feature map, a data, a signal, an input) refers to a "volume" of an image, which includes the width of the image, the height of the image, and the depth of the image. In another example, spatial scale of an image (e.g., a feature map, a data, a signal, an input) refers to a width and length of the image, e.g., width×length.

Figure 7:
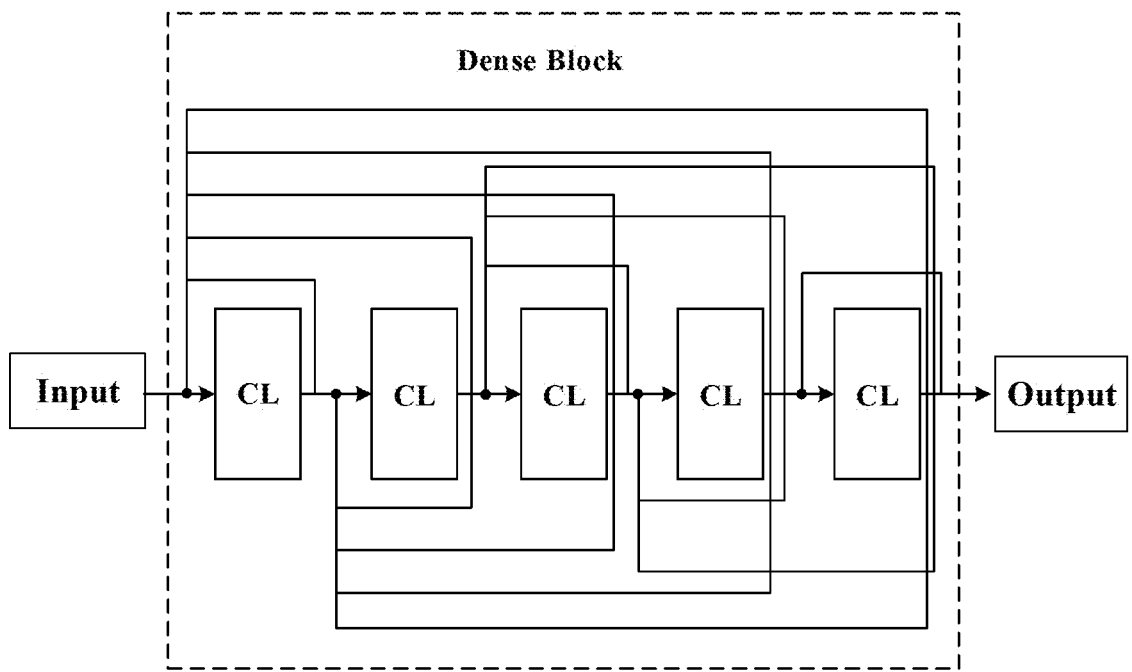
FIG. 7 is a schematic diagram of a structure of a Dense Block in some embodiments according to the present disclosure.

FIG. 7 is a schematic diagram of a structure of a Dense Block in some embodiments according to the present disclosure. Referring to FIG. 7, in some embodiments, an output from the respective Dense Block includes outputs respectively from the plurality of convolutional layers CL in the respective Dense Block. Optionally, the output from the respective Dense Block further includes the input to the respective Dense Block.

In some embodiments, an input to the respective convolutional layer in the respective Dense Block includes outputs respectively from any previous convolutional layers of the plurality of convolutional layers CL in the respective Dense Block. Optionally, the input to the respective convolutional layer in the respective Dense Block further includes the input to the respective Dense Block.

A number of kernels in the respective convolutional layer in the respective Dense Block is relatively small. Input to the respective convolutional layer in the respective dense block includes sufficient global features. The respective convolutional layer in the respective dense block reduces the scale of input to the respective convolutional layer, which can improve the computation speed.

In some embodiments, a structure of the first neural network and a structure of the second neural network are different. In some embodiments, the structure of the first neural network and the structure of the second neural network are the same. For example, the first neural network and the second neural network includes a same number of the plurality of dense blocks. A number of convolutional layers in the respective one of the plurality of dense blocks in the first neural network is the same as a number of convolutional layers in the corresponding dense block in the plurality of dense blocks in the second neural network. A number of pooling layers in the respective one of the plurality of dense blocks in the first neural network is the same as a number of pooling layers in the corresponding dense block in the plurality of dense blocks in the second neural network. A number of kernels of the respective one of the plurality of convolutional layers in the first neural network is the same as a number of kernels of the corresponding convolutional layer in the second neural network.

Figure 8:
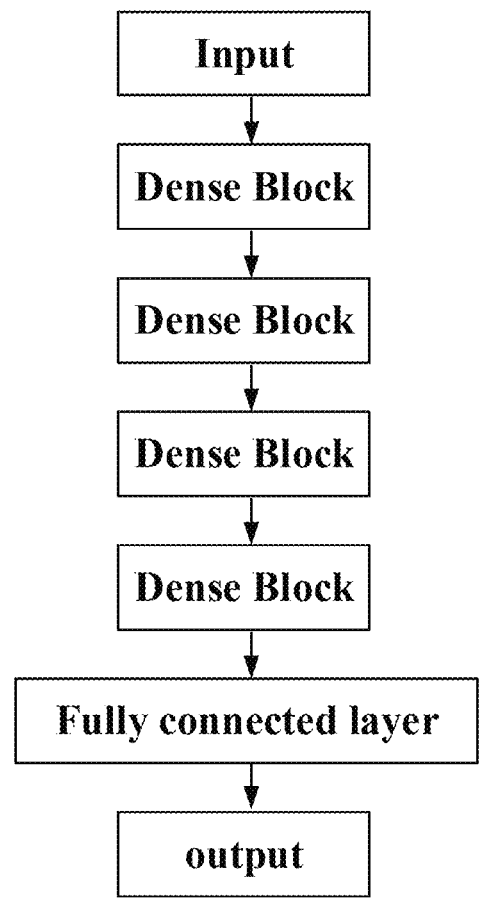
FIG. 8 is a schematic diagram of a structure of a DenseNet in some embodiments according to the present disclosure.

FIG. 8 is a schematic diagram of a structure of a DenseNet in some embodiments according to the present disclosure. In some embodiments, referring to FIG. 8, in some embodiments, the DenseNet includes four dense blocks. Optionally, a respective one of the four dense blocks includes eight convolutional layers. Optionally, a respective one of the eight convolutional layers includes 16 kernels.

Optionally, the DenseNet further includes one or more fully connected layers which are configured to convert the input having three dimensions into data having one dimension, and output a prediction value.

Various appropriate methods may be used to combine the first prediction value and the second prediction value to obtain a combined prediction value. Examples of method suitable for combing the first prediction value and the second prediction value includes averaging, weighted averaging, and statistical analysis.

In some embodiments, weighted averaging the first prediction value and the second prediction value is performed according to $P=P1*\alpha+P2*(1-\alpha)$; wherein P stands for the weighted average prediction value, P1 stands for the first prediction value; P2 stands for the second prediction value; $\alpha$ stands for a first weight of the first prediction value, and $(1-\alpha)$ stands for a second weight of the second prediction value.

Various appropriate method may be used for obtaining a value of $\alpha$. Optionally, the value of $\alpha$ can be assigned according to experience of a specialist. For example, by using statistical analysis, an influence of the first prediction value and an influence of the second prediction value to the image classification result are independently analyzed to find a suitable value of $\alpha$. For example, a numerical optimization method can be used to obtain the suitable value of $\alpha$ based on the existing influence of the first prediction value and the existing influence of the second prediction value on the image classification result. For example, $\alpha$ can be a parameter tuned in a pre-training process.

In some embodiments, the Gabor filter can filter the input image having a human face. Optionally, the input image and the plurality of filter response images are respective input in two DenseNets, and combining the prediction values output from the two DenseNet to obtain the image classification result. This process of recognizing facial express has a fast speed and can perform a real-time facial express recognition.

Moreover, the Gabor filter performs a feature extraction and a feature expression on the facial expression in the input image, the method of using the Gabor filter has a higher accuracy rate in facial recognizing result than a method without the Gabor filter.

The method of recognizing the facial expression can recognize various expressions, including expressions of happiness, surprising, calm, sorrow, and anger.

In another aspect, the present disclosure also provides an apparatus for recognizing a facial expression of a subject in an input image. In some embodiments, the apparatus includes a memory; and one or more processors. Optionally, the memory and the one or more processors are connected with each other. Optionally, the memory stores computer-executable instructions for controlling the one or more processors to filter the input image to generate a plurality of filter response images; input the input image into a first neural network; process the input image using the first neural network to generate a first prediction value; input the plurality of filter response images into a second neural network; process the plurality of filter response images using the second neural network to generate a second prediction value; weighted average the first prediction value and the second prediction value to generate a weighted average prediction value; and generating an image classification result based on the weighted average prediction value.

Optionally, the processor is a logical operation apparatus having data processing capabilities and/or program execution capabilities, such as Central Processing Unit (CPU), Field-Programmable Gate Array (FPGA), Microcontroller Unit (MCU), Digital Signal Processor (DSP), Application-Specific Integrated Circuit (ASIC), graphics processing unit (GPU), Tensor Processing Unit (TPU), Neural Network Processor Unit (NPU). Optionally, one or a plurality of the processor can be configured to execute the relevancy calculation concurrently with a parallel processor. Optionally, one or a plurality of the processor can be configured to execute part of the relevancy calculation. Optionally, other processors can be configured to execute the remaining part of the relevancy calculation.

Various appropriate memory may be used in the present virtual image display apparatus. Examples of appropriate memory include, but are not limited to, various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, magnetic disk or tape, optical storage media such as compact disk (CD) or DVD (digital versatile disk), and other non-transitory media. Optionally, the memory is a non-transitory memory. Various appropriate processors may be used in the present virtual image display apparatus. Examples of appropriate processors include, but are not limited to, a general-purpose processor, a central processing unit (CPU), a microprocessor, a digital signal processor (DSP), a controller, a microcontroller, a state machine, etc.

Optionally, the memory stores computer-executable instructions for controlling the one or more processors to filter the input image using a plurality of Gabor filters.

Optionally, the memory stores computer-executable instructions for controlling the one or more processors to filter the input image using a plurality of filters to generate a plurality of initial filter response images of different scales and/or different orientations.

Optionally, the plurality of initial filter response images of different scales and different orientations include initial filter response images of five different scales and/or eight different orientations.

Optionally, the memory stores computer-executable instructions for controlling the one or more processors to select a fraction of the plurality of initial filter response images as the plurality of filter response images. Optionally, the fraction of the plurality of initial filter response images are filter response images having scales and orientations empirically determined to be correlated to an accuracy of the second prediction result with correlation coefficients higher than a threshold value.

Optionally, a respective one of the plurality of filter response images has a scale selected from a group consisting of a 48×48 scale and a 67×67 scale, and an orientation selected from a group consisting of 0, π/8, and 2π/8.

Optionally, the first neural network is a DenseNet; and the second neural network is a DenseNet. For example, the first neural network includes a first DenseNet; and the second neural network includes a second DenseNet.

Optionally, the memory stores computer-executable instructions for controlling the one or more processors to weighted average the first prediction value and the second prediction value according to P=P1*α+P2*(1−α); wherein P stands for the weighted average prediction value, P1 stands for the first prediction value; P2 stands for the second prediction value; α stands for a first weight of the first prediction value, and (1−α) stands for a second weight of the second prediction value.

Figure 9:
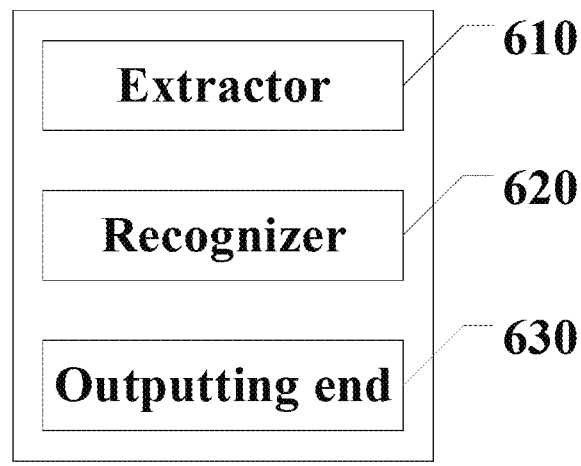
FIG. 9 is a schematic diagram of an apparatus for recognizing a facial expression of a subject in some embodiments according to the present disclosure.

FIG. 9 is a schematic diagram of an apparatus for recognizing a facial expression of a subject in some embodiments according to the present disclosure. In some embodiments, referring to FIG. 9, the apparatus for recognizing the facial express includes an extractor 610 configured to extract features of the input image to generate a plurality of filter response images; a recognizer 620 configured to respectively input the input image and the plurality of filter response image into a first neural network and the second neural network, to generate a first prediction value from the first neural network and a second prediction value from the second neural network; and an outputting end 630 configured to weighted average or combine the first prediction value and the second prediction value, to generate a weighted prediction value, and further generate an image classification result based on the weighted prediction value.

Optionally, one or more elements selected from a group consisting the extractor, the recognizer, and the outputting end are combined in a unit in the apparatus. Optionally, one of the elements selected from the group consisting the extractor, the recognizer, and the outputting end can be divided into several units in the apparatus.

Optionally, the apparatus of recognizing the facial expression further includes hardware, software, and circuits.

Figure 10:
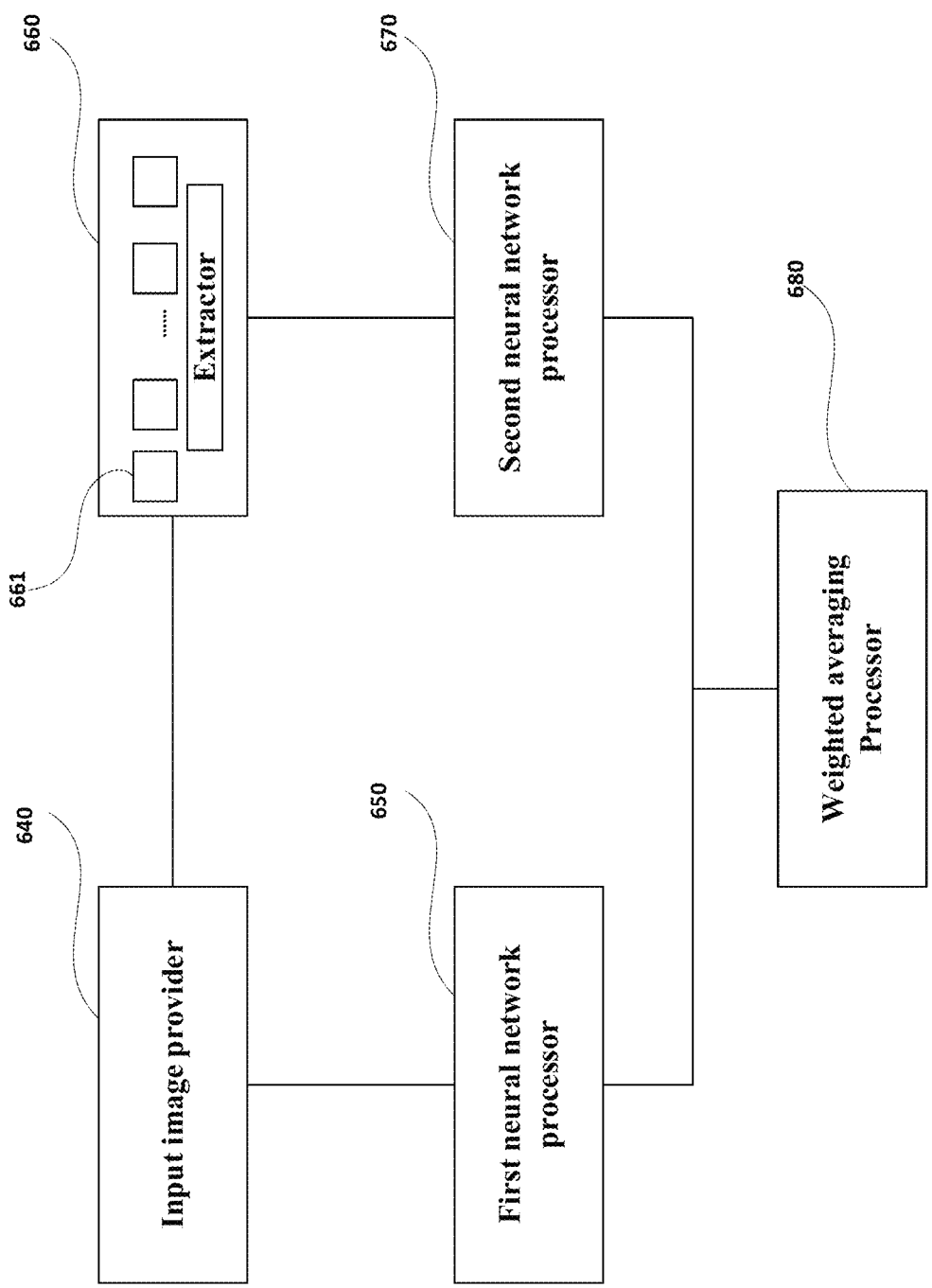
FIG. 10 is a schematic diagram of an apparatus for recognizing a facial expression of a subject in some embodiments according to the present disclosure.

FIG. 10 is a schematic diagram of an apparatus for recognizing a facial expression of a subject in some embodiments according to the present disclosure. In some embodiments, the apparatus is connected to an input image provider 640; a first neural network processor 650 connected to the input image provider 640 and configured to analyze an input image provided by the input image provider 640 to generate a first prediction value; an extractor 660 connected to the input image provider 640 and configured to extract features from the same input image from the input image provider 640 to generate a plurality of filter response images; a second neural network processor 670 connected to the extractor 660 and configured to analyze the plurality of filter response images to generate the second prediction value; and a weighted averaging processor 680 connected to both the first neural network processor 650 and the second neural network processor 670, and configured to combine or weighted average the first prediction value and the second prediction value, to generate weighted average prediction value and to further generate the image classification result based on the weighted average prediction value.

Optionally, the extractor 660 includes a plurality of Gabor filters 661. Optionally, the plurality of Gabor filters 661 are in parallel. Optionally, the extractor 660 configured to output a plurality of filter response images. For example, a respective one of the plurality of filter response images has a scale selected from a group consisting of a 48×48 scale and a 67×67 scale, and an orientation selected from a group consisting of 0, π/8, and 2π/8. The plurality of filter response images are respectively generated by applying the plurality of Gabor filters 661, a respective one of which has a scale selected from a group consisting of a 48×48 scale and a 67×67 scale, and an orientation selected from a group consisting of 0, π/8, and 2π/8.

Optionally, the first neural network processor 650 is configured to process a first DenseNet. For example, processing the first DenseNet includes running codes of the first DenseNet using the first neural network processor 650. Optionally, the second neural network processor 670 is configured to process a second DenseNet. For example, processing the second DenseNet includes running codes of the second DenseNet using the second neural network processor 670. Optionally, a structure of the first DenseNet and a structure of the second DenseNet are the same. Optionally, the first neural network processor 650 and the second neural network processor 670 processor has a same structure. For example, the first neural network and the second neural network includes a same number of the plurality of dense blocks. A number of convolutional layers in the respective one of the plurality of dense blocks in the first neural network is the same as a number of convolutional layers in the corresponding dense block in the plurality of dense blocks in the second neural network. A number of pooling layers in the respective one of the plurality of dense blocks in the first neural network is the same as a number of pooling layers in the corresponding dense block in the plurality of dense blocks in the second neural network. A number of kernels of the respective one of the plurality of convolutional layers in the first neural network is the same as a number of kernels of the corresponding convolutional layer in the second neural network. But the parameters in first neural network and the parameters in the second neural network are not the same.

Optionally, referring FIG. 5 and FIG. 10, each of the first DenseNet (e.g., the first neural network) run by the first neural network processor and the second DenseNet (e.g., the second neural network) run by the second neural network processor include four dense blocks, four convolutions and one pooling process performed on input to the first DenseNet and the second DenseNet. Optionally, a respective one of the four dense blocks includes eight convolutional layers. Optionally, a respective one of the eight convolutional layers includes 16 kernels.

Optionally, the first DenseNet further includes a fully connected layer configured to convert the input having three dimensions into data having one dimension, and output a first prediction value. Optionally, the second DenseNet further includes a fully connected layer configured to convert the input having three dimensions into data having one dimension, and output a second prediction value.

Optionally, the weighted averaging processor is configured to combine or weight average the first prediction value and the second prediction value, to generate the weighted average prediction value Optionally, referring to FIG. 10, the input image provider 640 is a physical storage device storing the input images. Optionally, the input image provider 640 is a virtual storage device e.g., VPS, cloud storage, etc., storing input images and transmit the input images through a network.

Optionally, the input image provider 640 is connected to the apparatus for recognizing the facial expression using networks including a wireless network, a wired network, or a combination of a wireless network and a wired network. Optionally, the networks include one or a combination of a local area network, an internet, a telecommunication network, and an internet of things based on an internet and/or a telecommunication network. Optionally, examples of the wired networks include twisted pair, coaxial cable and optical fiber configured to transmit data. Optionally, examples of the wireless network include WWAN, Bluetooth, Zigbee, and Wi-Fi.

The extractor, the first neural network processor, the second neural network processor, the weighted averaging processor are both functional portion of the apparatus for recognizing the facial expression. Processors can be used to perform the function of the extractor, the first neural network processor, the second neural network processor, the weighted averaging processor. Optionally, the functions of the extractor, the first neural network processor, the second neural network processor, the weighted averaging processor can be performed on one or more hardware or integrated circuits. Optionally, the functions of the extractor, the first neural network processor, the second neural network processor, the weighted averaging processor can be performed in physical devices including networks, processors, microcontroller devices.

Figures 11, 12:
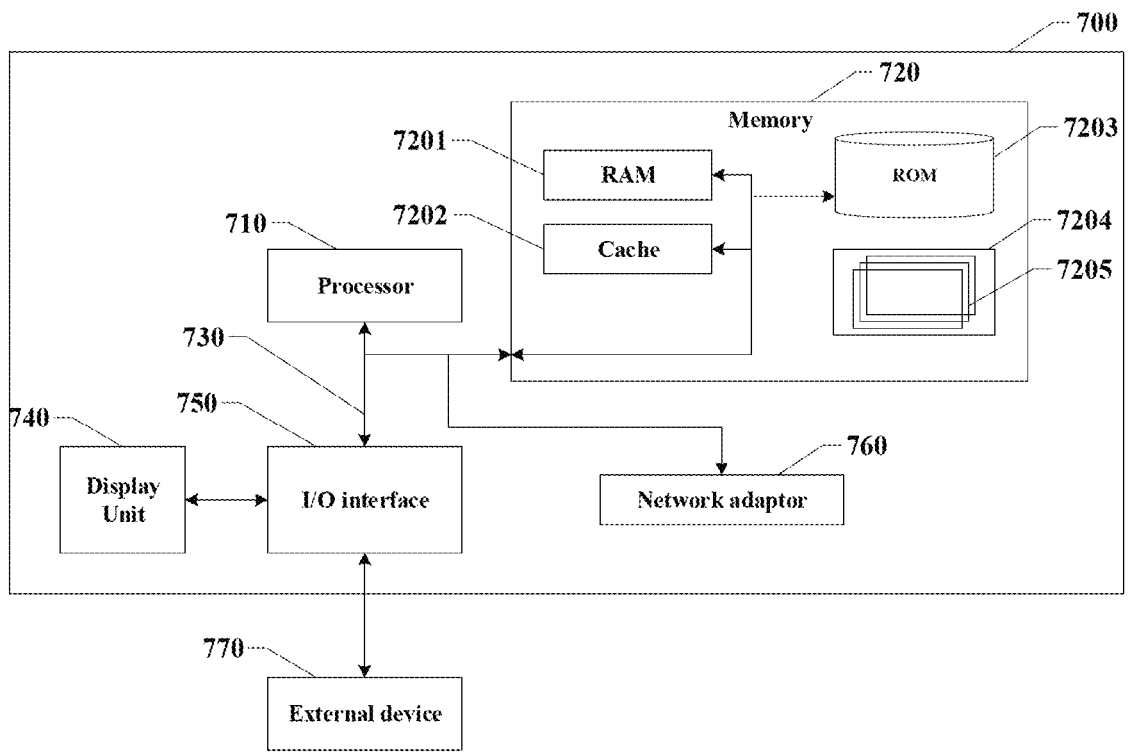
FIG. 11 is a schematic diagram of an apparatus for recognizing a facial expression of a subject in some embodiments according to the present disclosure.
FIG. 12 is a flow chart illustrating a method of pre-training an apparatus for recognizing a facial expression of a substrate in some embodiments according to the present disclosure.

FIG. 11 is a schematic diagram of an apparatus for recognizing a facial expression of a subject in some embodiments according to the present disclosure. In some embodiments, referring to FIG. 11, the apparatus 700 includes a processor 710, a memory 720 configured to store computer-executable instructions. For example, the processor 710 is configured to perform actions according to the computer-executable instructions to recognize the facial expression in the input image.

Optionally, the apparatus 700 further includes a bus 730 connecting different elements (e.g., memory 720 and processor 710) in the apparatus and a display unit 740 configured to display.

Optionally, the memory 720 includes a readable medium in the form of a volatile memory, including a random access memory (RAM) 7201, a cache 7202, and a read only memory (ROM) 7203.

Optionally, the memory 720 further includes a program/tool 7204 including one or more program modules 7205. Each of the one or more program modules 7205 include an operating system, one or more applications, and program data. Each of the one or more program modules 7205 include an implementation of a network environment.

Various types of buses can be adopted as the bus 730. Examples of types of buses include, but are not limited to one, a combination of, or a portion of Memory unit bus or memory unit controller, peripheral bus, graphics acceleration port, and processing unit.

Optionally, the apparatus 700 can be connected to and communicate with a one or more external devices 770 including a keyboard, a pointing device, a Bluetooth device, etc. Optionally, the apparatus 700 can be connected to and communicate with the one or more external devices configured to allow a user to communicate with the apparatus 700. Optionally, the apparatus 700 is connected to and communicate with external devices (e.g., routers, modems, etc.) configured to allow the apparatus 700 to communicate with one or more other apparatus. The communication between the apparatus 700 and the external devices can be performed via the I/O interface. Optionally, the apparatus 700 can be connected to and communicate with one or more networks (e.g., LAN, WAN, Internet) through a network adapter 760, and the network adapter 760 is connected to and communicate with other elements of the apparatus through bus 730.

Optionally, the apparatus 700 further includes a microcode, a device driver, a redundant processing unit, an external disk drive array, a RAID system, a tape drive, and a data backup storage system.

Optionally, the apparatus described herein can be performed in the form of software. For example, the apparatus described herein can be a software stored in a non-volatile storage medium (e.g., a CD-ROM, a USB flash drive, a mobile hard drive, etc.). Optionally, the software includes instructions allowing a computing device (e.g., personal computer, server, terminal device, or network device, etc.) to perform the method described herein.

In another aspect, the present disclosure also provide a method of using the apparatus for recognizing a facial expression. In some embodiments, the method of using the apparatus for recognizing the facial expression includes inputting an input image into the apparatus described herein using the input image provider and generating an image classification result using the weighted averaging processor.

In another aspect, the present disclosure also provides a method of pre-training an apparatus for recognizing a facial expression of a subject in an input image. FIG. 12 is a flow chart illustrating a method of pre-training an apparatus for recognizing a facial expression of a substrate in some embodiments according to the present disclosure. In some embodiments, referring to FIG. 12, the method of pre-training an apparatus described herein includes providing a first neural network and a second neural network; inputting a training image into an apparatus including the first neural network and the second neural network, and tuning parameters of the first neural network and the second neural network; and reiterating pre-training the first neural network and the second neural network.

Figure 13:
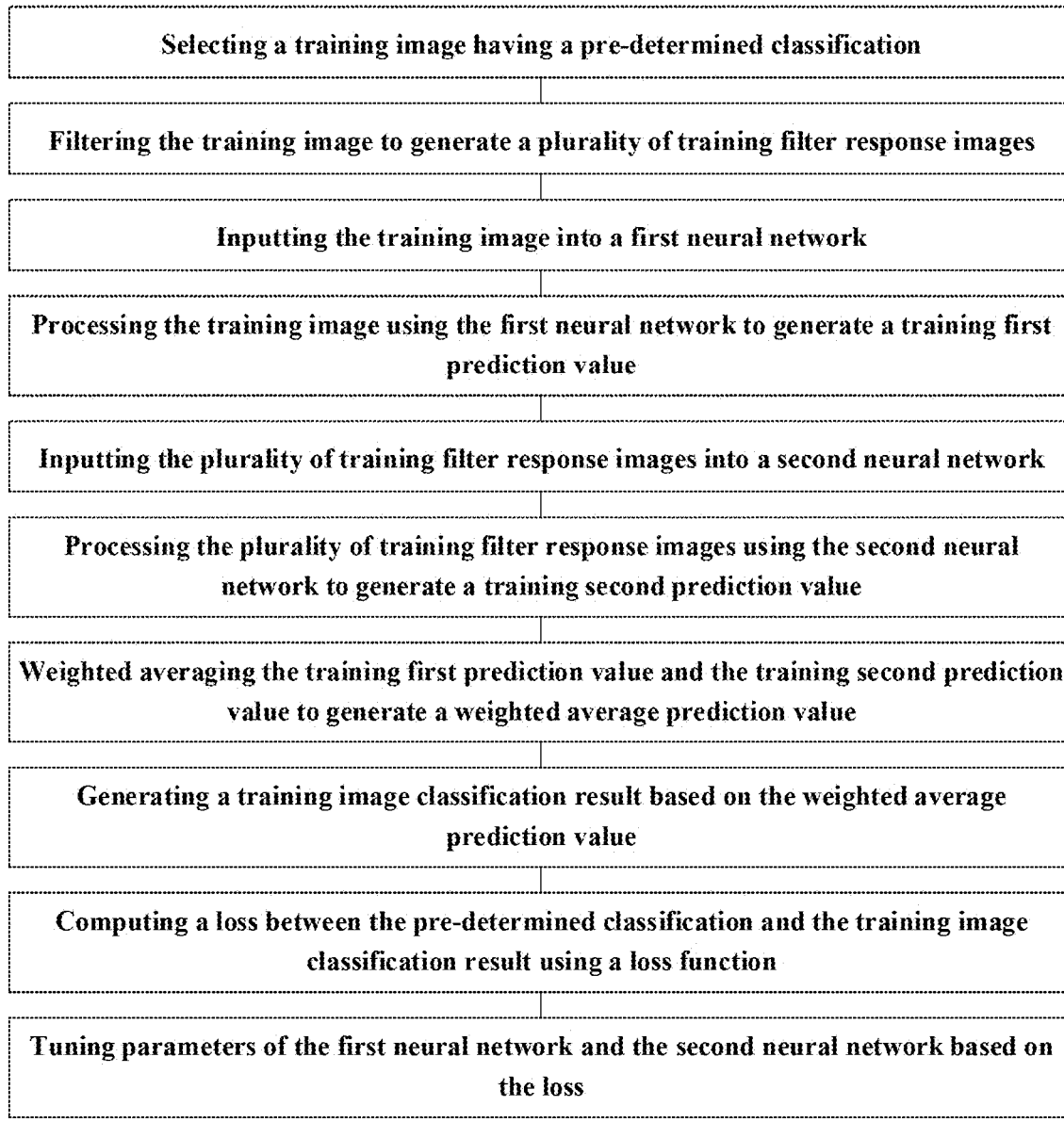
FIG. 13 is a flow chart illustrating a method of pre-training an apparatus for recognizing a facial expression of a substrate in some embodiments according to the present disclosure.

FIG. 13 is a flow chart illustrating a method of pre-training an apparatus for recognizing a facial expression of a substrate in some embodiments according to the present disclosure. In some embodiments, referring to FIG. 13, the method of pre-training the apparatus described herein includes selecting a training image having a pre-determined classification; filtering the training image to generate a plurality of training filter response images; inputting the training image into a first neural network; processing the training image using the first neural network to generate a training first prediction value; inputting the plurality of training filter response images into a second neural network; processing the plurality of training filter response images using the second neural network to generate a training second prediction value; weighted averaging the training first prediction value and the training second prediction value to generate a weighted average prediction value; generating a training image classification result based on the weighted average prediction value; computing a loss between the pre-determined classification and the training image classification result using a loss function; and tuning parameters of the first neural network and the second neural network based on the loss.

Optionally, the method of pre-training the apparatus described herein further includes reiterating pre-training the first neural network and the second neural network.

Optionally, filtering the training image is performed using a plurality of Gabor filters.

Optionally, filtering the training image is performed using a plurality of filters to generate a plurality of training initial filter response images of different scales and/or different orientations.

Optionally, the plurality of training initial filter response images of different scales and different orientations include training initial filter response images of five different scales and/or eight different orientations.

Optionally, the method of pre-training the apparatus described herein further includes selecting a fraction of the plurality of training initial filter response images as the plurality of training filter response images. Optionally, the fraction of the plurality of training initial filter response images are training filter response images having scales and orientations empirically determined to be correlated to an accuracy of the training second prediction result with correlation coefficients higher than a threshold value.

Optionally, a respective one of the plurality of training filter response images has a scale selected from a group consisting of a 48×48 scale and a 67×67 scale, and an orientation selected from a group consisting of 0, π8, and 2π/8.

Optionally, the first neural network is a DenseNet; and the second neural network is a DenseNet.

Optionally, weighted averaging the training first prediction value and the training second prediction value is performed according to $P'=P1'*\alpha'+P2'*(1-\alpha')$; wherein P' stands for the training weighted average prediction value, P1' stands for the training first prediction value; P2' stands for the training second prediction value; α' stands for a first weight of the training first prediction value, and (1−α') stands for a second weight of the training second prediction value.

Various pre-training methods may be used in the process of pre-training the apparatus described herein. Examples of pre-training methods include backpropagation, BAM two-way propagation, and forward propagation.

Optionally, the method of pre-training the apparatus described herein includes a supervised training, to obtain a trained first neural network and a trained neural network.

Optionally, the training image include human face and a pre-determined classification of a facial expression of the human face shown in the training image.

In another aspect, the present disclosure also provides a computer-program product for recognizing a facial expression. In some embodiments, the computer-program product includes a non-transitory tangible computer-readable medium having computer-readable instructions thereon. Optionally, the computer-readable instructions are executable by a processor to cause the processor to perform filtering the input image to generate a plurality of filter response images; inputting the input image into a first neural network; processing the input image using the first neural network to generate a first prediction value; inputting the plurality of filter response images into a second neural network; processing the plurality of filter response images using the second neural network to generate a second prediction value; weighted averaging the first prediction value and the second prediction value to generate a weighted average prediction value; and generating an image classification result based on the weighted average prediction value.

Optionally, the computer-readable instructions are executable by a processor to cause the processor to perform filtering the input image using a plurality of Gabor filters.

Optionally, the computer-readable instructions are executable by a processor to cause the processor to perform filtering the input image using a plurality of filters to generate a plurality of initial filter response images of different scales and/or different orientations.

Optionally, the plurality of initial filter response images of different scales and different orientations include initial filter response images of five different scales and/or eight different orientations.

Optionally, the computer-readable instructions are executable by a processor to cause the processor to further perform selecting a fraction of the plurality of initial filter response images as the plurality of filter response images. Optionally, the fraction of the plurality of initial filter response images are filter response images having scales and orientations empirically determined to be correlated to an accuracy of the second prediction result with correlation coefficients higher than a threshold value.

Optionally, a respective one of the plurality of filter response images has a scale selected from a group consisting of a 48×48 scale and a 67×67 scale, and an orientation selected from a group consisting of 0, π/8, and 2π/8

Optionally, the first neural network is a DenseNet; and the second neural network is a DenseNet.

Optionally, the computer-readable instructions are executable by a processor to cause the processor to further perform weighted averaging the first prediction value and the second prediction value according to $P=P1*\alpha+P2*(1-\alpha)$; wherein P stands for weighted average prediction value, P1 stands for the first prediction value; P2 stands for the second prediction value; α stands for a first weight of the first prediction value, and (1−α) stands for a second weight of the second prediction value.

Figure 14:
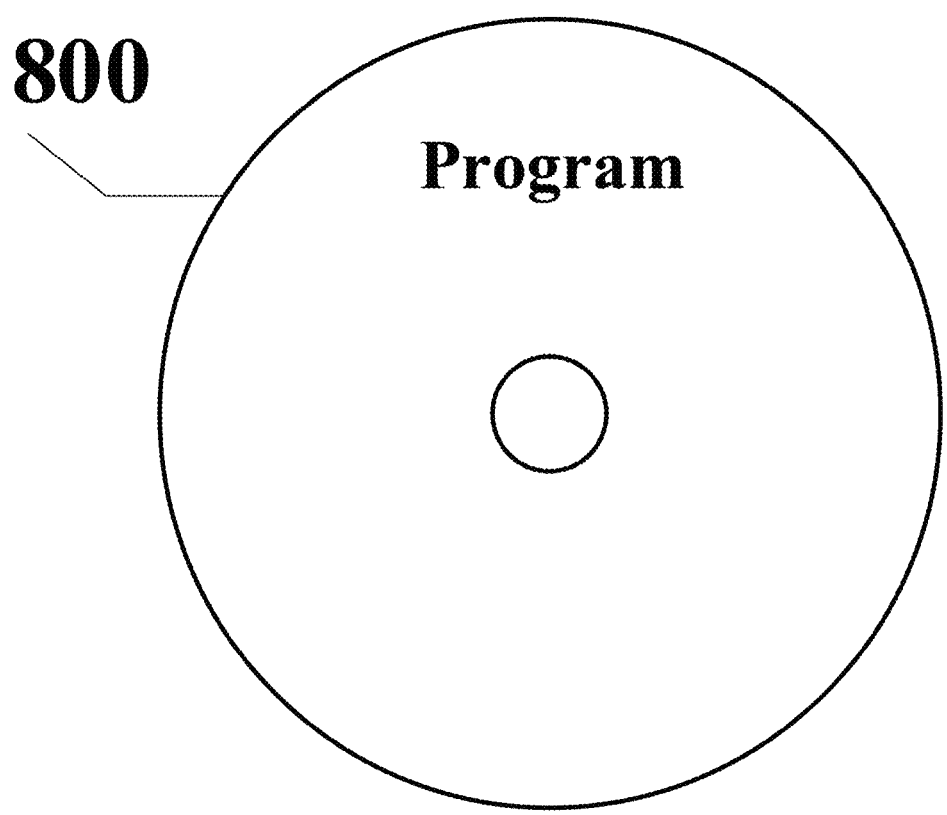
FIG. 14 is a schematic diagram of a computer-program product for recognizing a facial expression of a subject in some embodiments according to the present disclosure.

In another aspect, the present disclosure also provides a program for recognizing a facial expression using the method described herein. FIG. 14 is a schematic diagram of a computer-program product for recognizing a facial expression of a subject in some embodiments according to the present disclosure. In some embodiments, referring to FIG. 14, the program can be stored in a portable compact disk read only memory (CD-ROM), and run on a terminal device, such as a personal computer.

Various illustrative neural networks, units, modules, extractors, recognizers, ends, blocks, layers and other operations described in connection with the configurations disclosed herein may be implemented as electronic hardware, computer software, or combinations of both. Such neural networks, units, modules, extractors, recognizers, ends, blocks, layers and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method of recognizing a facial expression of a subject in an input image, comprising:
    filtering the input image to generate a plurality of filter response images;
    inputting the input image into a first neural network;
    processing the input image using the first neural network to generate a first prediction value;
    inputting the plurality of filter response images into a second neural network;
    processing the plurality of filter response images using the second neural network to generate a second prediction value;
    weighted averaging the first prediction value and the second prediction value to generate a weighted average prediction value; and
    generating an image classification result based on the weighted average prediction value;
    wherein weighted averaging the first prediction value and the second prediction value is performed according to $P=P1*\alpha+P2*(1-\alpha)$;
    wherein P stands for the weighted average prediction value, P1 stands for the first prediction value; P2 stands for the second prediction value; $\alpha$ stands for a first weight of the first prediction value, and $(1-\alpha)$ stands for a second weight of the second prediction value.

2. The computer-implemented method of claim 1, wherein filtering the input image is performed using a plurality of Gabor filters.

3. The computer-implemented method of claim 1, wherein filtering the input image is performed using a plurality of filters to generate a plurality of initial filter response images of different scales and/or different orientations.

4. The computer-implemented method of claim 3, wherein the plurality of initial filter response images of different scales and different orientations comprise initial filter response images of five different scales and/or eight different orientations.

5. The computer-implemented method of claim 3, further comprising selecting a fraction of the plurality of initial filter response images as the plurality of filter response images;
    wherein the fraction of the plurality of initial filter response images are filter response images having scales and orientations empirically determined to be correlated to an accuracy of the second prediction result with correlation coefficients higher than a threshold value.

6. The computer-implemented method of claim 4, wherein a respective one of the plurality of filter response images has a scale selected from a group consisting of a 48×48 scale and a 67×67 scale, and an orientation selected from a group consisting of 0, $\pi/8$, and $2\pi/8$.

7. The computer-implemented method of claim 1, wherein the first neural network is a DenseNet; and
    the second neural network is a DenseNet.

8. An apparatus for recognizing a facial expression of a subject in an input image, comprising:
    a memory; and
    one or more processors;
    wherein the memory and the one or more processors are connected with each other; and
    the memory stores computer-executable instructions for controlling the one or more processors to:
    filter the input image to generate a plurality of filter response images;
    input the input image into a first neural network;
    process the input image using the first neural network to generate a first prediction value;
    input the plurality of filter response images into a second neural network;
    process the plurality of filter response images using the second neural network to generate a second prediction value;

weighted average the first prediction value and the second prediction value to generate a weighted average prediction value; and generating an image classification result based on the weighted average prediction value;

wherein the memory stores computer-executable instructions for controlling the one or more processors to weighted average the first prediction value and the second prediction value according to $P=P1*\alpha+P2*(1-\alpha)$;

wherein P stands for the weighted average prediction value, P1 stands for the first prediction value; P2 stands for the second prediction value; $\alpha$ stands for a first weight of the first prediction value, and $(1-\alpha)$ stands for a second weight of the second prediction value.

9. The apparatus of claim 8, wherein the memory stores computer-executable instructions for controlling the one or more processors to filter the input image using a plurality of Gabor filters.

10. The apparatus of claim 8, wherein the memory stores computer-executable instructions for controlling the one or more processors to filter the input image using a plurality of filters to generate a plurality of initial filter response images of different scales and/or different orientations.

11. The apparatus of claim 10, wherein the plurality of initial filter response images of different scales and different orientations comprise initial filter response images of five different scales and/or eight different orientations.

12. The apparatus of claim 10, wherein the memory stores computer-executable instructions for controlling the one or more processors to select a fraction of the plurality of initial filter response images as the plurality of filter response images;

wherein the fraction of the plurality of initial filter response images are filter response images having scales and orientations empirically determined to be correlated to an accuracy of the second prediction result with correlation coefficients higher than a threshold value.

13. The apparatus of claim 11, wherein a respective one of the plurality of filter response images has a scale selected from a group consisting of a 48×48 scale and a 67×67 scale, and an orientation selected from a group consisting of 0, $\pi/8$, and $2\pi/8$.

14. The apparatus of claim 8, wherein the first neural network is a DenseNet; and the second neural network is a DenseNet.

15. A method of pre-training an apparatus for recognizing a facial expression of a subject in an input image, comprising:

selecting a training image having a pre-determined classification;

filtering the training image to generate a plurality of training filter response images;

inputting the training image into a first neural network;

processing the training image using the first neural network to generate a training first prediction value;

inputting the plurality of training filter response images into a second neural network;

processing the plurality of training filter response images using the second neural network to generate a training second prediction value;

weighted averaging the training first prediction value and the training second prediction value to generate a weighted average prediction value;

generating a training image classification result based on the weighted average prediction value;

computing a loss between the pre-determined classification and the training image classification result using a loss function; and tuning parameters of the first neural network and the second neural network based on the loss;

wherein weighted averaging the training first prediction value and the training second prediction value is performed according to $P'=P1'*\alpha'+P2'*(1-\alpha')$;

wherein P' stands for the training weighted average prediction value, P1' stands for the training first prediction value; P2' stands for the training second prediction value; $\alpha'$ stands for a first weight of the training first prediction value, and $(1-\alpha')$ stands for a second weight of the training second prediction value.

16. The method of claim 15, further comprising reiterating pre-training the first neural network and the second neural network.

17. The method of claim 15, wherein filtering the training image is performed using a plurality of Gabor filters.

18. The method of claim 15, wherein filtering the training image is performed using a plurality of filters to generate a plurality of training initial filter response images of different scales and/or different orientations.

19. The method of claim 18, wherein the plurality of training initial filter response images of different scales and different orientations comprise training initial filter response images of five different scales and/or eight different orientations.

20. The method of claim 18, further comprising selecting a fraction of the plurality of training initial filter response images as the plurality of training filter response images;

wherein the fraction of the plurality of training initial filter response images are training filter response images having scales and orientations empirically determined to be correlated to an accuracy of the training second prediction result with correlation coefficients higher than a threshold value.

* * * * *